(No Model.)

W. C. HAWKINS.
CALENDAR.

No. 475,500.

3 Sheets—Sheet 1.

Patented May 24, 1892.

Fig. 1.

| 18 | February. | | | | 91. | |
|---|---|---|---|---|---|---|
| WED. | THU. | FRI. | SAT. | SUN. | MON. | TUE. |
| 18 | | JAN. | | | 91 | |
| S | M | T | W | T | F | S |
| | | | | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |
| THU. | FRI. | SAT. | SUN. | MON. | TUE. | WED. |
| 18 | December | | | | 90. | |

Fig. 2.

| 18 | March. | | | | 91 | |
|---|---|---|---|---|---|---|
| SUN. | MON. | TUE. | WED. | THU. | FRI. | SAT. |
| 18 | | FEB. | | | 91 | |
| S | M | T | W | T | F | S |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |
| THU. | FRI. | SAT. | SUN. | MON. | TUE. | WED. |
| 18 | January. | | | | 91. | |

Fig. 3.

| 18 | January | | | | 92 | |
|---|---|---|---|---|---|---|
| WED. | THU. | FRI. | SAT. | SUN. | MON. | TUE. |
| 18 | | DEC. | | | 91 | |
| S | M | T | W | T | F | S |
| | | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 | | |
| FRI. | SAT. | SUN. | MON. | TUE. | WED. | THU. |
| 18 | November. | | | | 91 | |

Witnesses:
Frances P. Reilly
Alys. Scott

Inventor:
Wm. C. Hawkins
by P. M. Dowkins
Atty.

(No Model.)

W. C. HAWKINS.
CALENDAR.

No. 475,500.  Patented May 24, 1892.

3 Sheets—Sheet 2.

*Fig. 4.*

| 18 | | | | | | | 18 |
|---|---|---|---|---|---|---|---|
| MAR. | WED. | THU. | FRI. | SAT. | SUN. | MON. | TUE. | MAR. |
| FEB. | WED. | THU. | FRI. | SAT. | SUN. | MON. | TUE. | FEB. |
| 91 | 18 | JAN. | | 91 | | | 91 |
| | S | M | T | W | T | F | S |
| | | | | | 1 | 2 | 3 |
| | 4 | 5 | 6 | 7 | 8 | 9 | 10 |
| | 11 | 12 | 13 | 14 | 15 | 16 | 17 |
| | 18 | 19 | 20 | 21 | 22 | 23 | 24 |
| 18 | 25 | 26 | 27 | 28 | 29 | 30 | 31 | 18 |
| DEC. | THU. | FRI. | SAT. | SUN. | MON. | TUE. | WED. | DEC. |
| NOV. | TUE. | WED. | THU. | FRI. | SAT. | SUN. | MON. | NOV. |
| 90 | | | | | | | 90 |

*Fig. 5.*

| 18 | | | | | | | 18 |
|---|---|---|---|---|---|---|---|
| FEB. | SAT. | SUN. | MON. | TUE. | WED. | THU. | FRI. | FEB. |
| JAN. | WED. | THU. | FRI. | SAT. | SUN. | MON. | TUE. | JAN. |
| 92 | 18 | DEC. | | 91 | | | 92 |
| | S | M | T | W | T | F | S |
| | | | 1 | 2 | 3 | 4 | 5 |
| | 6 | 7 | 8 | 9 | 10 | 11 | 12 |
| | 13 | 14 | 15 | 16 | 17 | 18 | 19 |
| | 20 | 21 | 22 | 23 | 24 | 25 | 26 |
| 18 | 27 | 28 | 29 | 30 | 31 | | | 18 |
| NOV. | FRI. | SAT. | SUN. | MON. | TUE. | WED. | THU. | NOV. |
| OCT. | TUE. | WED. | THU. | FRI. | SAT. | SUN. | MON. | OCT. |
| 91 | | | | | | | 91 |

Witnesses:
Francis P. Reilly
Alex. Scott

Inventor:
Wm. C. Hawkins
by P. M. Voorhees
Atty.

(No Model.)　　　　　W. C. HAWKINS.　　　3 Sheets—Sheet 3.
CALENDAR.

No. 475,500.　　　　　　　Patented May 24, 1892.

Fig. 6.

| FEB.18 | WED. | THU. | FRI. | SAT. | SUN. | MON. | TUE. | FEB.91 |
|---|---|---|---|---|---|---|---|---|
| | | | 1891 | | | | | |
| | | | | | 1 | 2 | 3 | |
| | 4 | 5 | 6 | 7 | 8 | 9 | 10 | |
| JAN. | S | M | T | W | T | F | S | JAN. |
| | 11 | 12 | 13 | 14 | 15 | 16 | 17 | |
| | 18 | 19 | 20 | 21 | 22 | 23 | 24 | |
| | 25 | 26 | 27 | 28 | 29 | 30 | 31 | |
| DEC.18 | THU. | FRI. | SAT. | SUN. | MON. | TUE. | WED. | DEC.90 |

Fig. 7.

| JULY. | | 18 | AUG. | | 91 | | SEPT. |
|---|---|---|---|---|---|---|---|
| THU. | | 2 | 9 | SUN. | 16 | 23 | 30 | WED. |
| FRI. | | 3 | 10 | MON. | 17 | 24 | 31 | THU. |
| SAT. | | 4 | 11 | TUE. | 18 | 25 | | FRI. |
| SUN. | | 5 | 12 | WED. | 19 | 26 | | SAT. |
| MON. | | 6 | 13 | THU. | 20 | 27 | | SUN. |
| TUE. | | 7 | 14 | FRI. | 21 | 28 | | MON. |
| WED. | 1 | 8 | 15 | SAT. | 22 | 29 | | TUE. |

Witnesses:
Francis P. Rejley
Alys Scott

Inventor:
Wm. C. Hawkins
By R. A. Voorhees
Atty.

UNITED STATES PATENT OFFICE.

WILLIAM C. HAWKINS, OF TAUNTON, MASSACHUSETTS.

CALENDAR.

SPECIFICATION forming part of Letters Patent No. 475,500, dated May 24, 1892.

Application filed April 4, 1891. Serial No. 387,710. (No model.)

*To all whom it may concern:*

Be it known that I, WILLIAM C. HAWKINS, of Taunton, in the county of Bristol and State of Massachusetts, have invented a new and useful Calendar, which invention is fully set forth and illustrated in the following specification and accompanying drawings.

The object of this invention is to provide a calendar in which one or more of the past or coming months, or both, may be readily referred to on each page or exhibition-face for the current month without manipulation or disturbance of said calendar.

In the accompanying drawings, Figure 1 is a diagram of a calendar-page or calendar exhibition-face for the month of January, 1891; Fig. 2, a similar page for February, and Fig. 3 for December, of the same year, each of said pages being arranged so that the month last past and the month next ensuing may be referred to on the same page with the table for the current month. Figs. 4 and 5 are diagrams of pages containing calendar-tables for the months of January and December, 1891, arranged so that the two months last past and the two months next ensuing may be referred to in each case. Figs. 6 and 7 are modifications hereinafter described.

The invention consists in a calendar having printed or otherwise displayed on its page or exhibition-face, with the usual table for the current month, horizontally or vertically, as the particular arrangement of columns may call for, additional columns containing the names of or abbreviations for the days of the week in such order as to be referable to the same columns of dates as those placed for the current month.

The object of the several variations shown is to make the several months provided for on a single page or face readily distinguishable the one from the other.

In this method of constructing calendars the date-numbers for the maximum of thirty-one days are printed on every table of dates, and to call the attention of the observer to the use of the proper number of days only at or near the end of each month the figures for the last three days are printed or otherwise displayed in some distinguishing color, form, or size from the other twenty-eight numbers.

In Figs. 1, 2, 4, and 5 the dates "29," "30," and "31" are made in open outline figures, those from "1" to "28," inclusive, being solid.

In Figs. 6 and 7 the last three dates are made smaller than the rest for the same purpose, and they may be varied in color or in any way that will sufficiently distinguish them.

In Fig. 6 the column of names or abbreviations of the days of the week for the current month are placed near the center of the page between two lines of date-figures and those for the auxiliary months at the top and bottom in order to distinguish the several months the more readily one from the other.

In Fig. 7 the abbreviations for the days of the week as placed for the current month are set in a vertical column in the middle of the page between two columns of date-figures and those for the auxiliary months at the sides in similar vertical columns.

In any of the arrangements shown it is desirable to make the several sets of figures and letters as different from each other in color, form, size, or otherwise as possible, so as to avoid error in referring to the auxiliary months.

It is evident that the tables and columns may be arranged in other ways to conform to the principle of this invention. I do not therefore confine myself to the specific arrangements shown, nor to the number of past or coming months provided for on each page or face, as shown, as it is obvious that any number of auxiliary months may be thus provided for without departing from the gist of this invention.

Having thus fully described my said invention, I claim—

1. A calendar page or exhibition-face containing one or more columns or rows of names or abbreviations of names of the days of the week for the month or months last past and one or more columns or rows of names or abbreviations of names of the days of the week for the month or months next ensuing, one or both sets of said names, in addition to a table of dates and a corresponding column or row of names or abbreviations of names of the days of the week for the current month, said additional columns or rows being arranged to conform in position to the columns or rows of date-figures of the current month, so as to indicate the proper day of the week for the proper dates of the said past or coming months, substantially as set forth.

2. A calendar consisting of pages or exhibition-faces containing each a table of dates consisting of thirty-one date-numbers arranged in seven rows or columns corresponding to the days of the week and two or more rows or columns of names or abbreviations of names of the days of the week, one of said columns or rows of names being placed with reference to said table of date-numbers to suit the current month and the others placed to suit a month or months last past and a month or months next ensuing, one or both, substantially as set forth.

3. In a calendar, pages or exhibition-faces containing each a table of date-numbers with thirty-one numbers thereon and one or more columns or rows of names or abbreviations of the names of the days of the week arranged in suitable order for reference to said table of date-numbers for the given months, each page or face having printed or otherwise displayed thereon the last three date-numbers distinguished in color, form, size, or otherwise from the other date-numbers, substantially as set forth.

WM. C. HAWKINS.

Witnesses:
 THEO. H. FRIEND,
 P. R. VOORHEES.